(12) United States Patent
Deutsch

(10) Patent No.: US 10,136,761 B2
(45) Date of Patent: Nov. 27, 2018

(54) GRILL ATTACHMENT FOR PORTABLE HEATERS

(71) Applicant: Luther Deutsch, St. Paul, MN (US)

(72) Inventor: Luther Deutsch, St. Paul, MN (US)

(*) Notice: Subject to any disclaimer, the term of this patent is extended or adjusted under 35 U.S.C. 154(b) by 0 days.

(21) Appl. No.: 14/731,984

(22) Filed: Jun. 5, 2015

(65) Prior Publication Data

US 2015/0265098 A1 Sep. 24, 2015

Related U.S. Application Data

(60) Provisional application No. 62/109,180, filed on Jan. 29, 2015.

(51) Int. Cl.
*A47J 37/06* (2006.01)
*A47J 37/04* (2006.01)
*A47J 45/00* (2006.01)
*A47J 36/26* (2006.01)

(52) U.S. Cl.
CPC .......... *A47J 37/067* (2013.01); *A47J 37/049* (2013.01); *A47J 37/0682* (2013.01); *A47J 37/0694* (2013.01); *A47J 45/00* (2013.01); *A47J 36/26* (2013.01)

(58) Field of Classification Search
CPC .... A47J 37/049; A47J 37/067; A47J 37/0682; A47J 37/0694; A47J 36/26; A47J 45/00
USPC ..... 99/422, 426, 448; 126/9 R, 25 R, 29, 30, 126/41 R, 215
See application file for complete search history.

(56) References Cited

U.S. PATENT DOCUMENTS

| 2,376,640 | A | * | 5/1945 | Wall | A47J 37/0694 126/337 R |
| 4,393,857 | A | * | 7/1983 | Sanford | F24B 1/205 126/30 |
| 4,696,282 | A | * | 9/1987 | Incitti | F24B 1/202 126/25 R |
| 4,848,217 | A | * | 7/1989 | Koziol | A47J 37/0694 211/181.1 |
| 4,884,499 | A | * | 12/1989 | Rensch | A47J 37/0718 126/9 R |
| 4,911,146 | A | * | 3/1990 | Pushee | F24B 1/182 126/25 A |
| 4,930,491 | A | * | 6/1990 | Purello | A47J 37/0704 126/25 R |

(Continued)

FOREIGN PATENT DOCUMENTS

CN 103070620 A * 5/2013

OTHER PUBLICATIONS

English Machine Translation CN103070620.*
"The Original Mr. Heater 2012 Master Catalog," 2012, at p. 9.

*Primary Examiner* — Tu B Hoang
*Assistant Examiner* — Vy Nguyen
(74) *Attorney, Agent, or Firm* — Johnson and Phung LLC; Thomas N. Phung

(57) ABSTRACT

A grill rack for use in combination with a portable heater is provided. The grill rack comprises a support frame having a first end and a second end. A rack assembly is disposed on the support frame. The rack assembly comprises a plurality of cross members and a plate member. A pair of legs are transversely arranged at the first end of the support frame. A pair of outwardly extending arms are connected to the legs. The outwardly extending arms of the grill rack can be fastened to an opening on the upper end of a portable heater so as to heat or warm food thereon.

7 Claims, 2 Drawing Sheets

(56) References Cited

U.S. PATENT DOCUMENTS

| | | | |
|---|---|---|---|
| 2,048,769 A | | 2/1992 | Demarez |
| 5,127,824 A | * | 7/1992 | Barker ............... A47J 37/0713 |
| | | | 126/41 R |
| 5,237,912 A | | 8/1993 | Fins |
| 5,329,917 A | * | 7/1994 | Young ................... A47J 33/00 |
| | | | 126/29 |
| 5,353,694 A | * | 10/1994 | Fins ....................... A47J 33/00 |
| | | | 126/41 R |
| 5,839,361 A | * | 11/1998 | Richter ............... A47J 37/0694 |
| | | | 126/25 R |
| 5,947,007 A | * | 9/1999 | O'Grady ............. A47J 37/0763 |
| | | | 126/25 R |
| 6,006,740 A | * | 12/1999 | Ulrickson ............... F24B 1/205 |
| | | | 126/25 A |
| 6,131,560 A | | 10/2000 | Healy |
| 6,474,224 B1 | | 11/2002 | Natter |
| 6,553,984 B1 | * | 4/2003 | Thomas .............. A47J 37/0704 |
| | | | 126/29 |
| 7,591,220 B2 | * | 9/2009 | Sheridan, Jr. ......... A47J 37/048 |
| | | | 126/181 |
| 8,053,709 B2 | * | 11/2011 | Vandrak ................. F21V 33/00 |
| | | | 219/501 |
| 8,304,700 B1 | | 11/2012 | Eilers |
| 2010/0139651 A1 | * | 6/2010 | Vandrak ................. F24C 3/122 |
| | | | 126/92 B |
| 2010/0147291 A1 | * | 6/2010 | Vandrak ................. F24C 3/122 |
| | | | 126/92 R |
| 2012/0180784 A1 | * | 7/2012 | Vandrak ................. F24H 3/006 |
| | | | 126/92 AC |

* cited by examiner

GRILL ATTACHMENT FOR PORTABLE HEATERS

CROSS REFERENCE TO RELATED APPLICATION

This application claims the benefit of U.S. Provisional Application No. 61/109,180 filed on Jan. 29, 2015. The above identified patent application is herein incorporated by reference in its entirety to provide continuity of disclosure.

FIELD OF THE INVENTION

The present invention relates to a grill attachment for use in combination with a portable heater. The grill rack comprises a support frame including a rack assembly having a plurality of cross members and a plate member. The grill rack further includes a pair of legs each having outwardly extending support arms that are adapted to be fastened to an opening on the upper end of a portable heater.

BACKGROUND OF THE INVENTION

Grilling foods is extremely popular among outdoor enthusiasts. Hunters, campers, hikers, and mountain climbers often grill their food because grilling is well suited for outdoor use and can make use of fuels that are readily available in nature. However, the grills used for backyard barbecues are too heavy and bulky to be suitable for use by campers, hikers, and the like. These types of outdoor enthusiasts need grills that are lightweight and compact. For this reason portable grills have been proposed in the art, yet are still too bulky and cumbersome for travel on long trips.

In recent years, portable radiant heaters have become very popular for outdoor camping. The heaters take the place of messy and dangerous campfires and typically comprise one or more arrays of gas operated, ceramic burners which are usually mounted within highly polished reflector units. The ceramic burners are often directly connected to small portable propane tanks, so that the entire assemblage can be readily moved from place to place to provide highly concentrated localized heat. The heating units require no electricity, they are safe, silent and odorless in operation and require no warm-up time.

The portable heater can be fitted with a cooking accessory that can be directly connected to the radiant heater unit so that the unit can be used not only as a source of warming but also to conveniently cook various kinds of food. For example, foods such as steaks, fish, chicken and the like can be securely clamped between cooking racks that comprise a part of the cooking apparatus. However, none of the references cited below teach or suggest the unique structural features of the portable grill rack of the present invention.

Devices have been disclosed in the prior art that relate to racks attachable to space heaters. These include devices that have been patented and published in patent application publications. These devices generally relate to portable heating devices that include a collapsible rack thereon. For example, U.S. Pat. Nos. 8,304,700 and 6,131,560 relate to collapsible racks that may be folded, stored and transported adjacent with, and supported by the portable space heater. Other patents relate to a collapsible basket attachment, such as U.S. Pat. No. 2,048,769.

These prior art devices have several known drawbacks. The prior art devices relate to a combination heater and rack. Repeatedly moving and adjusting the rack coupled to the heater may be time consuming and inconvenient. Further, such devices may not be suited for removably attaching to the heater and do not include a combination heating plate and cross members disposed on the rack.

In light of the devices disclosed in the prior art, it is submitted that the present invention substantially diverges in design elements from the prior art and consequently it is clear that there is a need in the art for an improvement to existing grill attachments for portable heaters. In this regard the instant invention substantially fulfills these needs.

SUMMARY OF THE INVENTION

In view of the foregoing disadvantages inherent in the known types of attachments for portable heaters now present in the prior art, the present invention provides a new and improved grill rack attachment for portable heaters wherein the same can be utilized for providing convenience for the user when cooking or warming food.

It is therefore an object of the present invention to provide a new and improved grill rack attachment for portable heaters that has all of the advantages of the prior art and none of the disadvantages.

It is another object of the present invention to provide a grill rack attachment for portable heaters including a support frame having a first end and a second end. The support frame provides a support surface for warming and heating food thereon.

Another object of the present invention is to provide a grill rack attachment including a rack assembly disposed on the support frame. The rack assembly comprises a plurality of cross members and a plate member. The plurality of cross members are disposed on the second end of the support frame and the plate member is disposed on the first end of the support frame. The rack assembly supports the food thereon.

Yet another object of the present invention is to provide a grill rack attachment including a pair of legs transversely arranged at the first end of the support frame. A pair of outwardly extending arms are connected to the legs. The outwardly extending arms of the grill rack are adapted to be fastened to an opening on the upper end of a portable heater so as to heat or warm food thereon. In one configuration, the arms are perpendicular to each leg and engage with opening in the portable heater.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
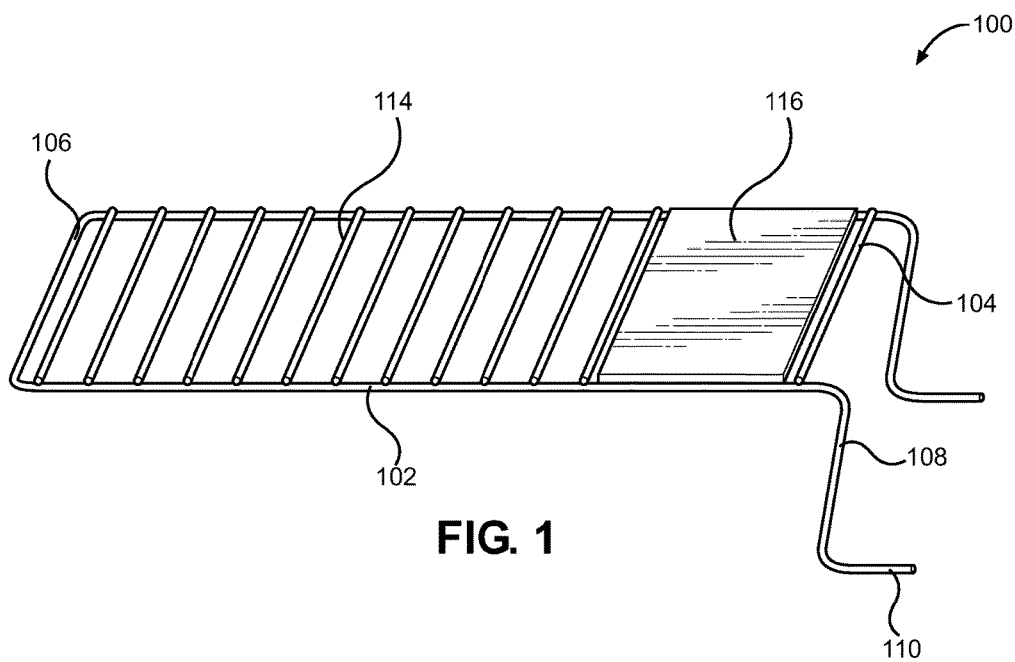
FIG. 1 shows a perspective view of the grill attachment according to one embodiment of the present invention.

Reference is made herein to the attached drawings. Like reference numerals are used throughout the drawings to depict like or similar elements of the grill attachment for portable heaters. For the purposes of presenting a brief and clear description of the present invention, the preferred embodiment will be discussed as used for warming and heating food with a portable heater. The figures are intended for representative purposes only and should not be considered to be limiting in any respect.

The grill attachment provides a compact, easy to use food cooking accessory that can be directly connected to a portable heating unit so that the unit can be used as a source of warming but also to conveniently cook various kinds of food. The spacing between the racks which support the food thereon can easily be adjusted to readily accommodate various foods, such as steaks of different thicknesses. The spacing between the cooking rack and the ceramic burners can also be easily adjusted so as to control the rate of cooking.

Figure 2:
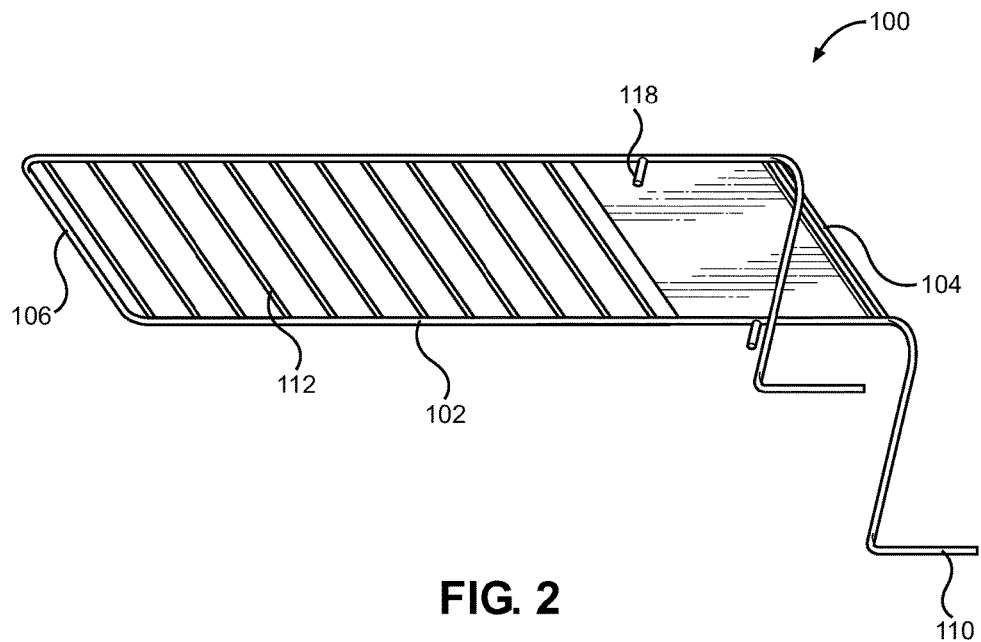
FIG. 2 shows an underside perspective view of the grill attachment according to one embodiment of the present invention.

Referring now to FIGS. 1 and 2, there are shown perspective views of the grill attachment according to embodiments of the present invention. The grill attachment 100 is used in combination with a portable heater. The grill attachment 100 includes a support frame 102 having a first end 104 and a second end 106. The support frame 102 is shown as having a substantially rectangular shape, but may include various other configurations in alternate embodiments. Preferably, the support frame 102 is composed of a metal or other similar heat conducting material.

The support frame 102 further includes a pair of legs 108 transversely arranged at the first end 104. The legs 108 are perpendicular to the support frame 102 and extend downwardly such that the support frame 102 is above the distal end of each leg 108. A pair of outwardly extending arms 110 are connected to the distal end of the legs 108. Each of the legs 108 and arms 110 form an S-shape at the first end 104 of the support frame 102. One end of the grill attachment 100 includes arms that serve as fasteners for securement to the heat vent openings or apertures 111 located on an upper end surface 120 of a portable heater 122. The arms 110 may include hooks or outwardly extending bars that can be fastened via a cantilevered connection to heat vent opening or apertures 111 on the upper end of a portable heater 122. In this way, the grill attachment 100 can be easily secured to the portable heater 122 proximal a heat source of portable heater 122 so that the portable heater can be used to warm or cook the user's food.

The support frame 102 further includes a rack assembly disposed on the support frame 102. The rack assembly comprises a plurality of cross members 114 and a plate member 116. In one embodiment, the plurality of cross members 114 are disposed on the second end 106 of the support frame 102 and the plate member 116 is disposed on the first end 104 of the support frame 102. The plate member 116 is substantially planar and rectangular. In this configuration, the first end 104 of the rack assembly serves as a hot plate and the second end 106 of the rack assembly serves as a grill rack. It is contemplated that the rack assembly can have multiple configurations that aid in the warming and cooking of food thereon. In some embodiments, the support frame 102 further includes at least two locking pins 118. The locking pins 118 are located on the underside of the support frame 102 and lock the grill attachment 100 in the heater while also providing additional support of the connection between the grill attachment 100 and the portable heater 122 through their engagement with a portion of the upper end surface 120 of the portable heater 122.

Figure 3:
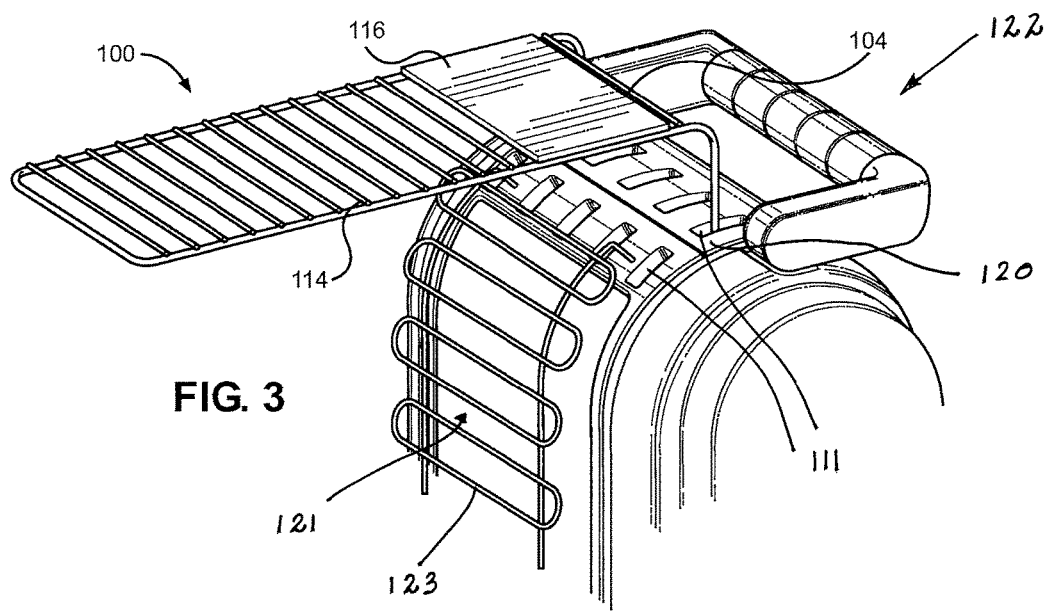
FIG. 3 shows the grill attachment coupled to a portable heater according to one embodiment of the present invention.

Referring now to FIG. 3, there is shown the grill attachment 100 coupled to portable heater 122 according to one embodiment of the present invention. Portable heater 122 is shown having ceramic burners 121 located within the portable heater 122 with the ceramic burner 121 being covered by a protection grid or screen 123. In operation, the user can removably secure the grill attachment 100 to the upper end of a portable heater 122 such that the grill attachment 100 is in a horizontal orientation above protection screen 123 and proximal ceramic burner 121. A first end 104 of the grill attachment 100 includes one or more fasteners thereon, such as outwardly extending hooks or posts for securement via a cantilevered connection to the upper end of a portable heater 122. The grill attachment 100 includes plate member 116 and a plurality of spaced cross members 114. The user can place food items, pots, or pans directly thereon. The heat from the portable heater 122 can then be used to heat or cook the user's food.

Figure 4:
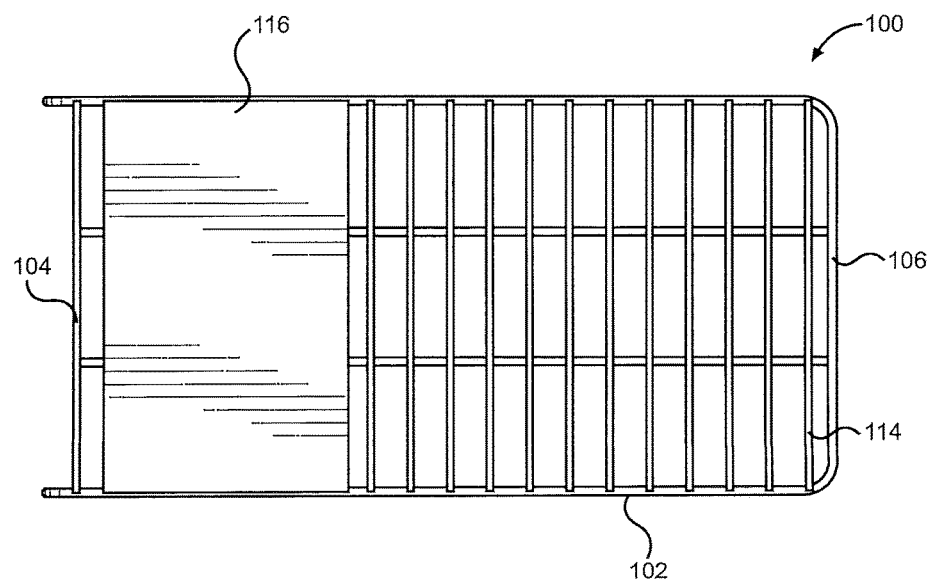
FIG. 4 shows an overhead view of the grill attachment according to another embodiment of the present invention.

Referring now to FIG. 4, there is shown an overhead view of the grill attachment according to another embodiment of the present invention. The grill attachment 100 includes a support frame 102 with multiple configurations. In the illustrated embodiment, the support frame 102 includes a rack assembly having a plurality of cross members 114 and a grill plate member 116. In this configuration, the rack assembly of the support frame 102 can include one or more vertical cross members 114 and one or more horizontal cross members 116 to provide a grid pattern. The rack assembly is shown as having a substantially rectangular shape, but may include various other configurations in alternate embodiments.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A combined portable heater and grill attachment comprising:
   a portable radiant heater having ceramic burners located within said portable radiant heater and a protection screen covering said ceramic burners;
   a plurality of heat vent openings located on an upper end of said portable radiant heater and above of said protection screen;

a grill attachment having a support frame having a first end and a second end;

a pair of legs directly extending from said first end of said support frame perpendicular downward from said support frame;

a pair of arms extending forwardly of said first end of said support frame with each arm connected to a corresponding leg of said pair of legs forming an S-shape, each of said arms releasably fastenable to a corresponding heat vent opening of said upper end of said portable radiant heater;

at least two locking pins located on an underside of said support frame and proximal to said pair of legs and said first end of said support frame, said locking pins engaging behind an end of said protection screen proximal said upper end surface of said portable radiant heater to lock said grill attachment to the portable radiant heater and provide additional support of the connection between said grill attachment and said portable radiant heater;

a rack assembly disposed on the support frame, said rack assembly comprising a plurality of cross members and a plate member with said support frame, said pair of legs, said pair of arms and said rack assembly comprising a one-piece integral unit; and said forwardly extending arms releasably coupling said support frame to a portable heater via a cantilevered connection.

2. The combined portable heater and grill attachment of claim 1, wherein the plurality of cross members are disposed on the second end of the support frame.

3. The combined portable heater and grill attachment of claim 1, wherein the plate member is disposed on the first end of the support frame.

4. The combined portable heater and grill attachment of claim 1, wherein said arms are perpendicular to corresponding leg.

5. The combined portable heater and grill attachment of claim 1, wherein the plate member is a substantially square metal plate.

6. The combined portable heater and grill attachment of claim 1, wherein the plate member is disposed between a first section of the rack assembly and a second section of the rack assembly.

7. A portable heater, comprising:

a ceramic burner located within said portable heater;

a protection screen covering said ceramic burner;

a plurality of heat vent openings located on an upper end of said portable heater above said protection screen;

a grill attachment having a support frame having a first end and a second end;

a pair of legs disposed on opposing sides at the first end, each of the pair of legs directly extending from said first end perpendicular downward from the support frame;

a pair of arms extending forwardly of said first end of said support frame with each arm is connected to a corresponding leg of said pair of legs forming an S-shape, each of said forwardly extending arms are releasably fastenable to a corresponding heat vent opening of said upper end of said portable heater to releasably couple said grill attachment to said portable heater via a cantilevered connection;

at least two locking pins located on an underside of said support frame and proximal to said pair of legs and said first end of said support frame, said locking pins engaging behind an end of said protection screen proximal said upper end surface of said portable heater to lock said grill attachment to said portable radiant heater and provide additional support of the connection between said grill attachment and said portable heater; and a rack assembly disposed on the support frame, said rack assembly comprises a plurality of cross members and a plate member with said support frame, said pair of legs, said pair of arms and said rack assembly comprising a one-piece integral unit.

* * * * *